United States Patent [19]

Ogasawara

[11] Patent Number: 5,170,106

[45] Date of Patent: Dec. 8, 1992

[54] METHOD OF PROTECTING MOTOR AGAINST OVERLOAD AND MOTOR CONTROL DEVICE

[75] Inventor: Hiromitsu Ogasawara, Akishima, Japan

[73] Assignee: TACHI-S Co., Ltd., Akishima, Japan

[21] Appl. No.: 780,947

[22] Filed: Oct. 23, 1991

[51] Int. Cl.⁵ ................................. H02H 7/08
[52] U.S. Cl. ................................. 318/434; 361/23
[58] Field of Search ............ 318/434, 459, 461, 463, 318/465, 470, 272; 361/23, 29, 30, 33, 51, 78, 86, 88; 73/488, 494, 495, 510; 180/282, 285; 388/903, 933

[56] References Cited

U.S. PATENT DOCUMENTS

| | | | |
|---|---|---|---|
| 4,327,391 | 4/1982 | Grzebielski | 361/31 |
| 4,532,567 | 7/1985 | Kade | 361/31 |
| 4,574,226 | 3/1986 | Binder | 318/434 X |
| 4,810,943 | 3/1989 | Kawaguchi et al. | 318/434 |
| 4,945,278 | 7/1990 | Nakashima | 318/434 X |
| 4,955,069 | 9/1990 | Ionescu | 361/31 X |
| 4,985,666 | 1/1991 | Nakabayashi | 318/434 |

FOREIGN PATENT DOCUMENTS

| | | | |
|---|---|---|---|
| 129878 | 6/1988 | Japan | 318/470 |
| 2012504 | 7/1979 | United Kingdom | 318/470 |

*Primary Examiner*—A. Jonathan Wysocki
*Attorney, Agent, or Firm*—Oldham, Oldham & Wilson

[57] ABSTRACT

A method of protecting a motor against overload, wherein a voltage of the motor is transformed into a pulse in a manner avoiding influence from the toque of motor, and such pulse having a width is compared with a motor revolution number so as to output an overload detection signal. The overload detection signal in excess of a present value is detected to stop the motor. A motor control device is also provided for that purpose, which includes a chopping wave generator circuit, an operational amplifier and a gate circuit.

4 Claims, 4 Drawing Sheets

METHOD OF PROTECTING MOTOR AGAINST OVERLOAD AND MOTOR CONTROL DEVICE

BACKGROUND OF THE INVENTION

1. Field of the Invention

The present invention relates to a method of protecting a motor against an overload and a motor control device associated therewith, in which an overload state of the motor is detected and responsive thereto the motor is controlled its drive so as to be protected against overload.

2. Description of Prior Art

As well known hitherto, a motor drive control is effected for actuate the movable members in automobile, such as a powered seat or powered window. The motor is controlled its drive by a motor control device incorporating a microcomputer.

This motor control system has the likelihood of the motor's overload state when the movable members are forcibly stopped due to an externally applied forces, in which case, an over-current is flowed in the motor, causing overheat or damages to the motor per se. Thus, a safety aspect will be insufficient. Solution to this problem is to detect the overload state and quickly block supply of voltage to the motor, by means of an over-current detecting method, a motor revolution detecting method, or the like.

The over-current detecting method consists in detecting a terminal voltage of over-current detector resistance connected in series with the motor and if the voltage is raised, the overload state is determined.

The motor revolution detecting method consists in checking the pulse generating period and if the period is changed abnormally, the overload state is determined. In this method, the pulses are generated from a rotation sensor responsive to the revolutions of the motor.

However, with regard to the over-current detecting method, the voltage to the motor is insufficient because of its consumption in the over-current detector resistance, as a result of which a given revolution number, torque or other characteristics of the motor are not obtainable well. The current in the motor is sensitive to the ambient temperature and an increase of the temperature changes the motor current, which in turn changes the terminal voltage of the overcurrent detector resistance. Consequently, at the overload state, the torque of motor will be lowered below the normal torque range, thus preventing full use of motor characteristics. The motor is therefore limited its ranges for applications. On the other hand, as to the motor revolution detecting method, there is no such problem of motor characteristics since the voltage is constantly supplied to the motor without any resistances.

Nonetheless, in view of the fact that a battery is normally used as a power source for the motor in the automobile, the voltage supplied from the battery to the motor (motor voltage) is easily subject to changes according to the running speed of the automobile. This is understandable from FIG. 1, wherein the motor voltage (Eb) is not constant, and changeable at such degrees as indicated by Eb1, Eb2, Eb3 and Eb4. Such voltage variations are generally considered to fall within 9V to 16V. Within this voltage variation range, the motor is driven. Since the motor torque is in a proportional relation with the motor voltage, regardless of a given motor revolution number at No, the motor torque will be changed greatly with the voltage variations, as indicated by the designations Eb1 to Eb4 and T1 to T4. Thus, if the motor voltage amounts to the greatest value at Eb4 due to the overload state of motor in operation, the motor revolution number goes down below the set value (No), and torque turns excessively great at the Eb4. This apparently results in requiring greater rigidity and strength of drive mechanisms and movable members associated with the motor. Consequently, those mechanisms and members has to be increased in size and weight, with more complicated structure, thus making more annoying and troublesome the design works and assemblage of device.

SUMMARY OF THE INVENTION

In view of the foregoing drawbacks, it is thus a purpose of the present invention to provide a method of protecting a motor against an overload and a motor control device therefor, which permits for detecting an overload state of the motor without an excessive torque applied thereto.

In order to accomplish such purpose, according to the invention, a voltage of the motor is transform into a rectangular pulse whose width is changeable in a reverse proportion to the motor voltage by use of chopping wave generator circuit and operational amplifier, then such pulse width is compared with a number of pulses generated from a rotation sensor which counts the motor revolution, the rectangular pulse and motor revolution pulse are processed through a gate circuit into an overload detection signal by way of selecting a certain number of the motor revolution pulse only within a range falling in the rectangular pulse width, and such overload detection signal is checked by a central processing unit against a preset value. Thus, if the pulse number of the overload detection signal exceeds over the preset value, the supply of voltage to the motor is at once blocked.

Accordingly, a constant number of pulses are output from the gate circuit as an overload detection signal, irrespective of variations in the motor voltage level, and therefore, the motor torque remains unchangeable at a fixed amount, not amenable to the motor revolution number. Hence, at a fixed torque, the overload state of motor can be detected, which means to permit for setting an amount of torque so as to prevent an excessive load from being applied to the motor as well as its associated mechanism and movable members. The construction surrounding the motor is thus simplified and can be formed in a small size.

While the overload state of motor is determined from the lowering of motor revolution number responsive to the increase of torque, yet supply of voltage to the motor is not impeded by, for example, the over-current detector resistance as found in the prior art. A rated voltage can be supplied substantially to the motor, so that the motor may operate generally with its original characteristics.

The circuit arrangement in the present invention is not easily affected by a variable change of ambient temperature. The motor torque can be obtained fully up to the given level, thus allowing the motor to operate with it original characteristics.

DETAILED DESCRIPTION OF PREFERRED EMBODIMENTS OF THE INVENTION

Figure 2:
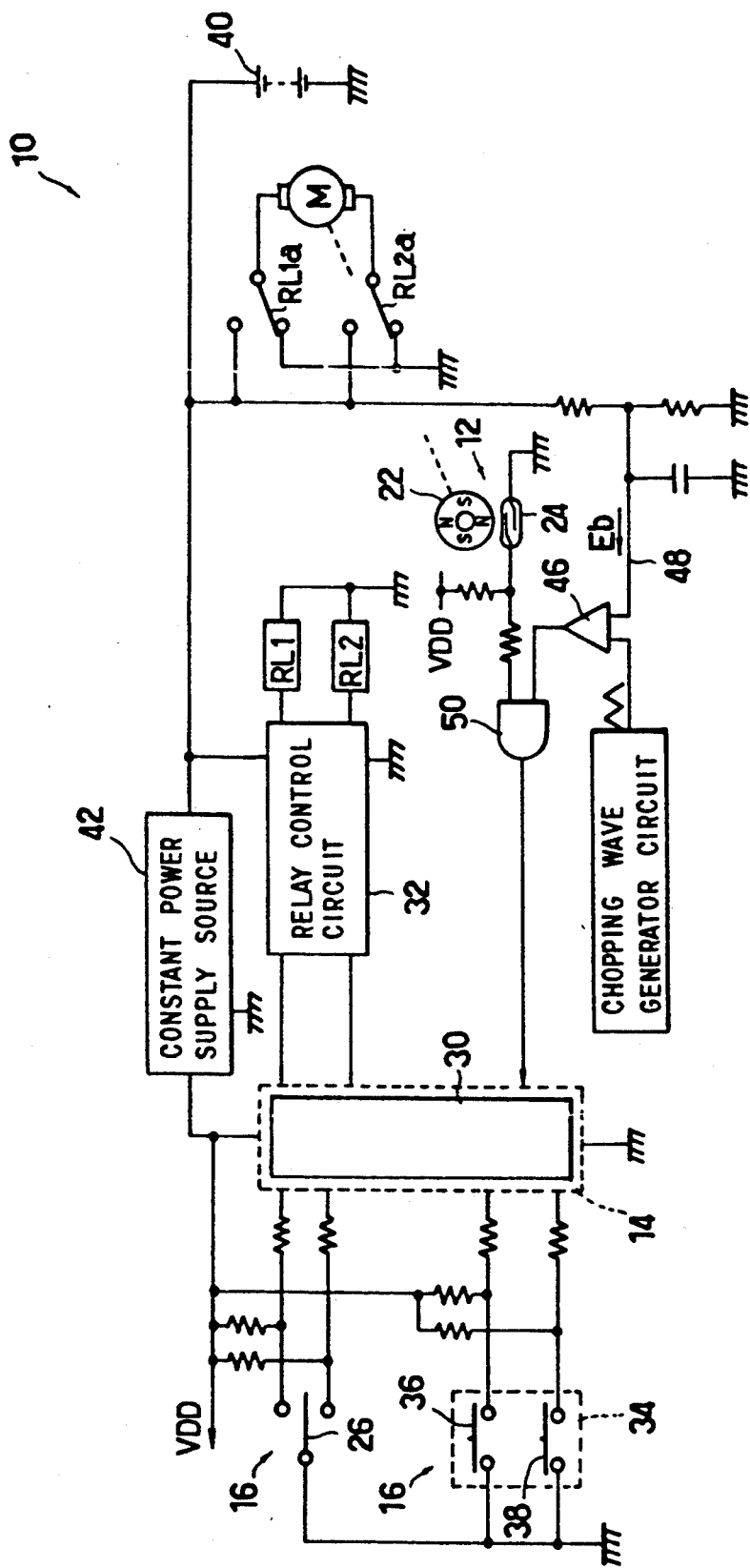
FIG. 2 is a block diagram of a motor control device in accordance with the present invention.
Figure 3:
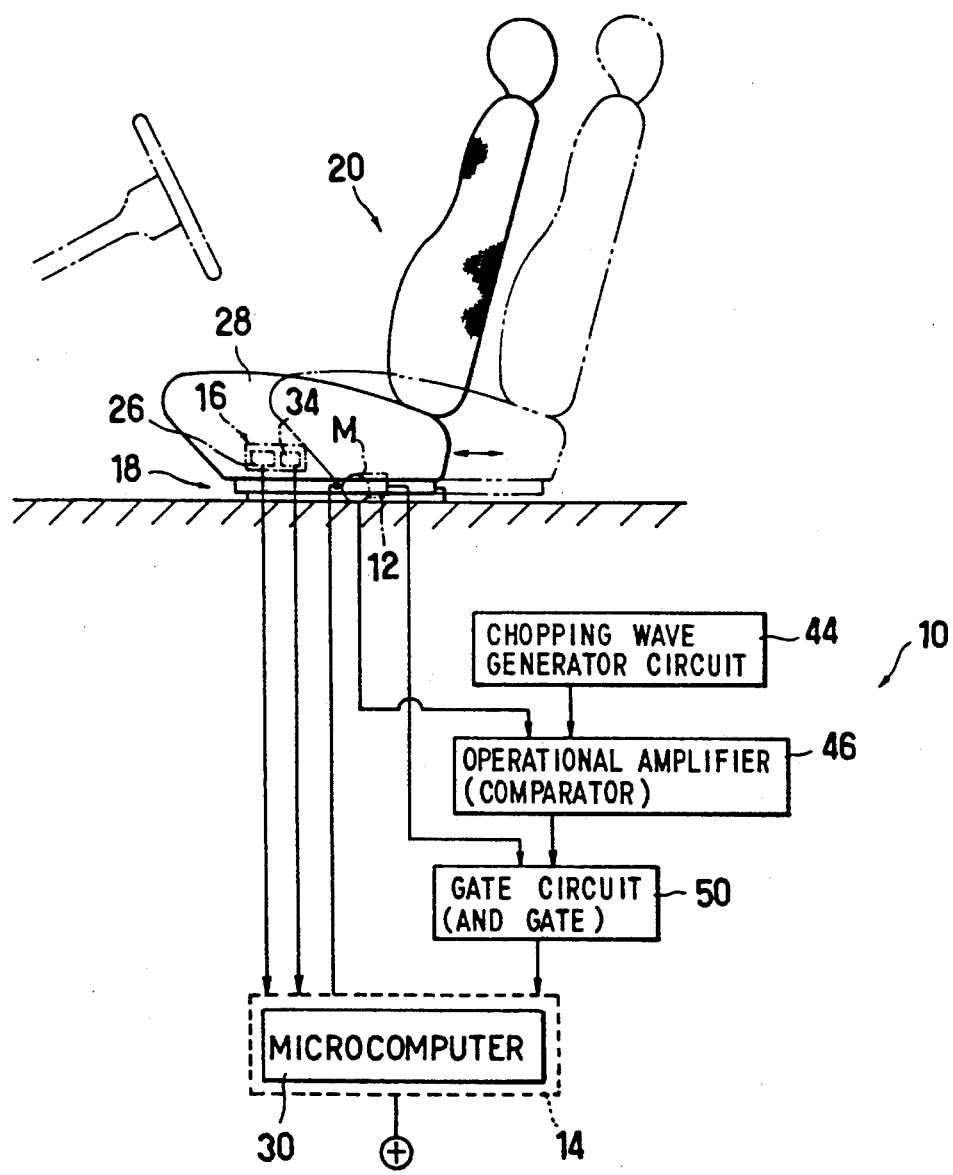
FIG. 3 is a schematic block diagram showing a connection between the device and a seat.

Referring to FIGS. 2 and 3, there is illustrated a motor control device (10) for carrying out the method of protecting a motor (M) against overload in accordance with the present invention. The device (10) basically comprises a rotation sensor (12) equipped with a motor (M), a central processing unit (14) which will be referred to as "CPU" hereinafter, relays (32, RL1, RL1a, RL2, RL2a), a chopping wave generator circuit (44), an operational amplifier (46), a gate circuit (50) and a switch unit (16).

The motor (M) is provided as a drive source for causing fore-and-aft movement of a seat (driver's seat) (20) via a seat slide device (18), as shown in FIG. 3.

The rotation sensor (12), as shown in FIG. 2, is composed of a disc-like permanent magnet (22) fixed to an output shaft (not shown) of the motor (M) and a lead switch (24) disposed to the magnet (22). With actuation of the motor (M), the magnet (22) is rotated simultaneously, varying its poles to cause the lead switch (24) to be switched on and off for generating pulses.

As in FIG. 2, the lead switch (24) of rotation sensor (12) is electrically connected with the CPU (14) so that pulses generated by the motor (M) are output into the CPU (14). The CPU (14) checks on the input pulses, and counts them by addition and subtraction so as to detect the position of a movable member or the seat (20). Hence, in this embodiment, the rotation sensor (12) functions as a seat position detector.

The motor (M) is driven through operation of the switch unit (16). As shown in FIGS. 2 and 3, the switch (16) includes a manual switch (26) disposed laterally of seat cushion of the seat (20). The manual switch (26) is a self-return seesaw-type switch having an neutral off position and a pair of switch position, by which the drive or revolution direction of the motor (M) is changed, and is electrically connected with the CPU (14).

The CPU (14) includes a microcomputer (30) which processes input signals or pulses according to a memorized programs and then outputs a proper control signal in the circuit shown. The control signal is to be output firstly into the relay control circuit (32) which then energizes one of first and second relays (RL1, RL2) to set a contactor in contact with the corresponding one of the relay contacts (RL1a, RL2a). With this relay control, the motor is controlled its drive in terms of revolution direction, namely, normal or reverse direction.

Thus, to operate the manual switch (26) will cause the CPU (14) to instruct the relays (RL1, RL2) so as to properly control the drive of motor (M) for position adjustment of the seat (20) in fore-and-aft direction, whereby the occupant thereon can set a best seat position according to his or her taste and physiques. At the same time, the pulses generated from the sensor (12) will be counted as revolution number of the motor (M), and the counted pulse numbers are stored in memory as a position of the seat (20). Such memorized data can be called by a memory switch (34) included in the switch unit (16). The memory switch (34), as shown in FIG. 2, includes a memory setting switch (36) and a memory call switch (38), which are preferably of a self-return push switch type, respectively. The two switches (36)(38) are also electrically connected with the CPU (14). Like the manual switch (26), the memory switch (34) is located at the lateral side of seat cushion (28).

With the above-stated switch arrangement, it is to be seen that, assuming the seat (20) to be located at a certain position, the operation of the memory setting switch (36) will emit a certain signal into the CPU (14), and the pulse number counted from the sensor (12), i.e. the revolution number of motor (M) counted during movement of seat from a reference point to said certain position, will be stored in memory as a memory position within the CPU (14). On the other hand, it is to be seen that, assuming the seat (20) to be located at the other position than the foregoing memory position, operating the the memory call switch (38) will activate the CPU (14) to check on the pulse number counted from the sensor (12) and detect the present position of the seat (20). Then, the CPU (14) will make a comparison between the counted pulse number at the present position (i.e. a value obtained for the seat position) and that at the memory position (i.e. a value stored in memory), and will instruct the motor (M) to keep at work until those two values are brought in registry with each other, to thereby return the seat to the memory position.

Figure 1:
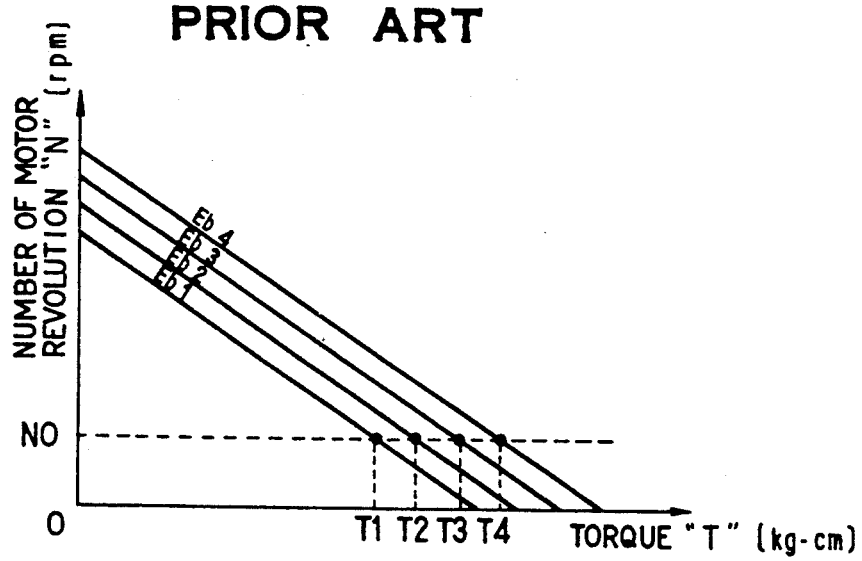
FIG. 1 is a graph showing a torque-revolution characteristics (T-N characteristics) of a motor in a conventional method of protecting the motor against overload.

As seen from FIG. 1, the motor (M), CPU(14) and relay control circuit (32) are electrically connected to a battery (40) provided in the automobile, and in particular, the CPU (14) is connected to the battery (40) via a constant power supply source (42).

In accordance with the present invention, as will be described later in detail, the motor voltage Eb is transformed into a pulse whose duration corresponding thereto, after which, a pulse corresponding to the motor voltage and a pulse generated by motor revolution are compared with each other in order that an overload detection signal may be output. The overload detection signal will be checked to conduct the overload detection of the motor (M).

Now, reference is made to FIGS. 2 and 3, the motor control device (10) of the present invention includes a chopping wave generator circuit (44) and an operational amplifier (46). The operational amplifier (46) in this embodiment forms a comparator which effect a comparison between two different input signals. By means of such comparator, if a certain voltage exceeds over a reference voltage, a high level signal (pulse) is output. As can be seen from FIG. 3, both electric line (48) and chopping wave generator circuit (44) are connected to the comparator (operation amplifier) (46). The electric line (48) is introduced from the motor (M) to the comparator (46), as shown.

Figure 4:
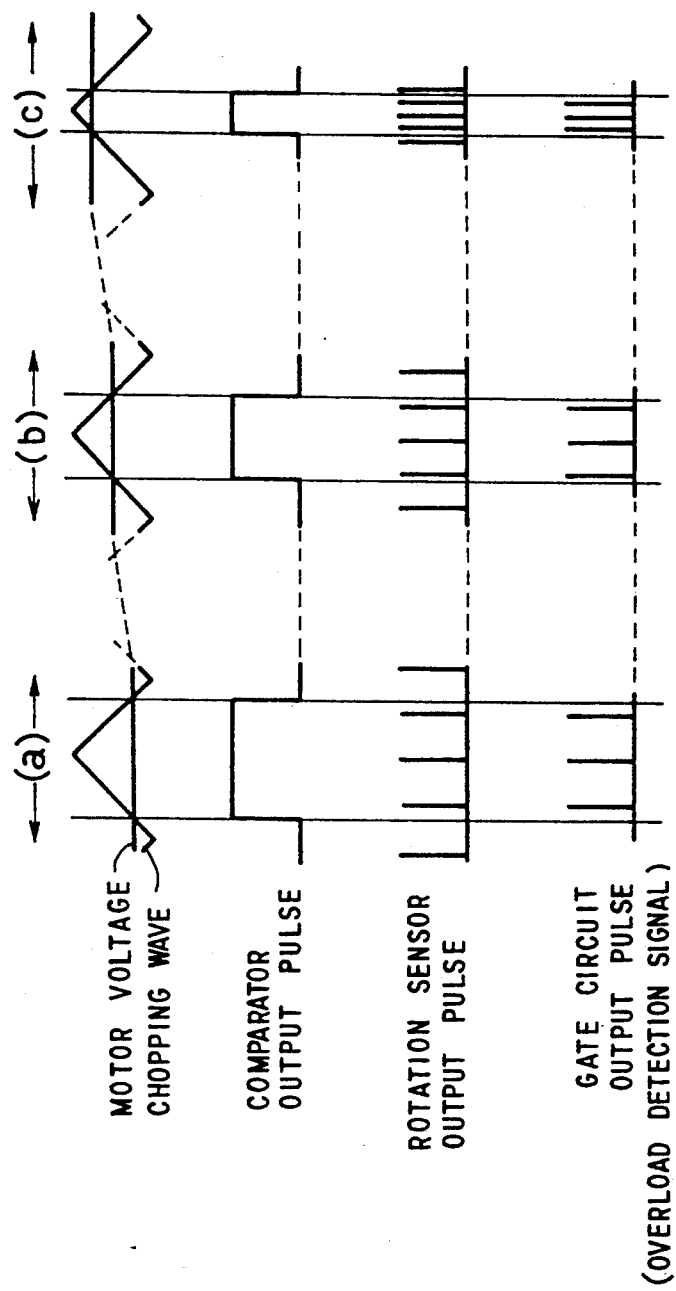
FIG. 4 is a diagram showing output waveforms from an operational amplifier and gate circuit.

With such comparator (46), as shown in FIG. 4, the motor voltage (Eb) is a reference voltage value, and therefore, a voltage difference between the chopping wave and reference voltage comes out as a rectangular wave with corresponding width through the comparator (46). Otherwise stated, the comparator (46) computes such voltage difference and outputs the corresponding width of rectangular wave, as diagrammed in FIG. 4. Thus, as understandable by the three designations (a), (b) and (c) in the FIG. 4, with the increases of motor voltage (Eb), the pulses output from the comparator (46) are reduced in width, indicating a reverse proportion relation with the motor voltage (Eb), whereupon the width of rectangular pulse from the comparator (46) is varied in a reverse proportion to the motor voltage (Eb).

Figure 5:
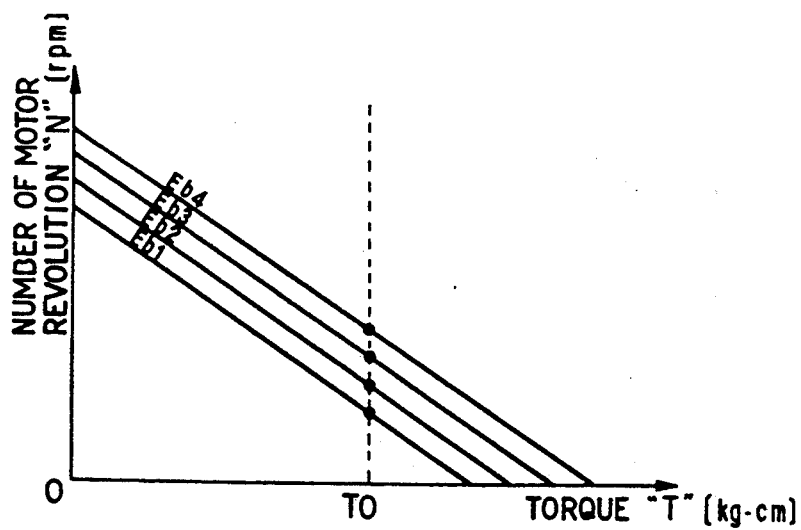
FIG. 5 is a graph showing a torque-revolution characteristics (T-N characteristics) of a motor obtained according to a method of protecting the motor against overload in the present invention.

In the FIG. 4, it can be seen that, in accordance as the motor voltage (Eb) increases, the number of pulses output from the rotation sensor (12) is increased in a proportional relation therewith, thus indicating the decrease in pulse generation period of the motor sensor (12) in a proportion to the increase of motor voltage (Eb). This is also understandable from the graphs in FIGS. 1 and 5 as a common factor.

Accordingly, it should be noted that, normally, in a reverse proportion to the above-discussed proportional relation between the increase of motor voltage (Eb) and decrease in pulse generation period of rotation sensor (12), the comparator (46) functions to reduce the value of motor voltage (Eb) in order to numerically set the torque of motor (M) at a constant torque value, as will become apparent later.

As shown in FIGS. 2 and 3, both comparator (46) and lead switch of rotation sensor (12) are electrically connected to the gate circuit (50). The gate circuit (50) (as a logic circuit) is so arranged as to output a certain number of the above-defined rotation sensor's output pulses in a proportional relation with above-defined voltage value being set by the comparator (46) (i.e. the width of rectangular pulse being output from the comparator (46)). In this respect, it is to be noted that such output of rotation sensor's pulses is done subsequent to the gate circuit (50) checking on and selecting a set of rotation sensor's pulses which falls within the width of one rectangular pulse output from the comparator (46). Preferably, the gate circuit (50) forms an AND gate. The gate circuit (50) is connected to the CPU (14). The above-described pulses from the gate circuit (50) may be input as an overload detection signal into the CPU (14) in case of overload state of motor (M), in which case, the number of such pulses is counted and compared with a preset value by means of the CPU (14) for determining the motor overload state.

With the above-described arrangement, when the motor (M) is applied a load and reduced its revolution number, the period of pulses generated from the rotation sensor (12) is rendered longer. In that case, the pulses of rotation sensor (12) are naturally reduced in number and responsive thereto, the number of pulses from the gate circuit (50) (i.e. the overload detection signal) is also reduced. If the pulses of the gate circuit (50) identified as the overload detection signal are reduced down below a set value, the CPU (14) determines the motor (M) to be in the state of overload and immediately stop the supply of voltage to the motor (M). The motor (M) is thus protected against an over-current which is produced in such overload state.

Accordingly, referring again to FIG. 4, it is appreciated that a constant number of pluses are output from the gate circuit (50) as an overload detection signal, irrespective of variations in the motor voltage level, and as such, the torque of motor remains unchangeable at a fixed amount (T0), not amenable to the motor revolution number (N) which is changeable in proportion to the motor voltage levels (Eb1 to Eb4). Hence, at a fixed torque, the CPU (14) determines the overload state of motor (M), which permits for setting an amount of torque which may be produced in the overload state of motor (M) so as to prevent an excessive load from being applied to the motor (M) as well as the associated mechanism movable members. This is advantageous in that the mechanisms and movable members adjacently connected with the motor (M) can be constructed simply at a rigidly or strength which just resists such set amount of torque, and thus it is possible to restrict the reinforcement of those mechanisms within a lowest possible level, which avoids lager size and greater weight of them. The construction surrounding the motor is therefore simplified much more, and further since an excessive torque is not exerted upon the motor, its construction is also simplified and can be made smaller.

In accordance with the present invention, another advantageous effects are found as follows:

(i) At the time of detecting the overload of motor, the position of seat (20) is also detected by virtue of rotation sensor and memory mechanism, and thus, the CPU (14) immediately instructs the motor (M) to cease its drive at a stopped point, responsive to the motor revolution number being reduced. This protects a stopper, which is adapted to physically stop the seat (20) at the stopped point, against an excessive load being applied from the seat (20) and associated movable members.

(ii) The overload state of motor is determined from the lowering of motor revolution number responsive to the increase of torque. The supply of voltage to the motor is not impeded by, for example, the over-current detector resistance as found in the prior art. A rated voltage can be supplied substantially to the motor, so that the motor may operate generally with its original characteristics.

(iii) The circuit arrangement in the present invention is not easily affected by change of ambient temperature. The motor torque can be obtained fully up to the given level, thus allowing the motor to operate with it original characteristics.

While having described the present invention as above, it should be understood that the invention is not limited to the illustrated embodiment, but any other modifications, replacements and additions may structurally be possible without departing from the spirit and scope of the appended claims. For instance, a separate special a comparator circuit such as a preset counter may be provided between the the gate circuit (50) and CPU (14) for controlling the drive of motor (M). Instead of such rotation sensor (12) of position detecting type, any other suitable sensor capable of emitting pulses responsive to the motor revolution may be employed. The motor control device (10) may be applied for controlling a reclining device, a seat lifter, a movable head rest, or a movable mirror used in the automobile. The present invention may also be applied to any other motor control systems, apart from those of automobile.

What is claimed is:

1. A method of protecting a motor against an overload, comprising the steps of:
    transforming a voltage of said motor into a first pulse with a width corresponding to a voltage value thereof;
    making a comparison between said first pulse and a second pulse generated responsive to a revolution of said motor;
    processing said first and second pulses into an overload detection signal by selecting a certain number of said second pulse only within a range falling in said width of said first pulse;

outputting said overload detection signal;

counting a number of pulse associated with said overload detection signal;

checking said number of pulse associated with said overload detection signal against a preset value;

determining an overload state of said motor, if said number of pulse exceeds over said preset value, and immediately blocking supply of a voltage into said motor.

2. A method of protecting a motor against an overload, comprising the steps of:

transforming a voltage of said motor into a rectangular pulse whose width is changeable in a reverse proportion to said motor voltage;

making a comparison between said width of said rectangular pulse and a number of pulses generated responsive to a revolution number of said motor;

processing said rectangular pulse and said number of motor revolution pulse into an overload detection signal by selecting a certain number of said motor revolution pulse only within a range falling in said width of said rectangular pulse;

outputting said overload detection signal;

counting a number of pulse associated with said overload detection signal;

checking said number of pulse associated with said overload detection signal against a preset value;

determining an overload state of said motor, if said number of pulse exceeds over said preset value, and immediately blocking supply of a voltage into said motor.

3. A motor control device comprising:

a motor for causing movement of a movable member;

a rotation sensor which generates pulse responsive to a revolution of said motor;

a switch means for driving said motor so as to adjust a position of said movable member;

a central processing unit which processes an input data according to a predetermined program and controls a drive of said motor;

a chopping wave generator circuit which generates a predetermined chopping wave;

an operation amplifier which effects a comparison between said chopping wave and a voltage of said motor, and outputs a rectangular pulse having a width which is changeable in a reverse proportion to said voltage of said motor; and a gate circuit which receives said pulse generated from said rotation sensor and said rectangular pulse, then selects a certain number of said rotation sensor pulse within a range falling in said width of said rectangular pulse, and outputs said certain number of said rotation sensor pulse as an overload detection signal into said central processing unit;

wherein said central processing unit counts said certain number of said rotation sensor pulse and check it against a preset value, and wherein if said pulse number exceeds over said preset value, said central processing unit determines said motor to be in an overload state, and immediately block supply of said voltage into said motor.

4. The motor control device as defined in claim 3, wherein said gate circuit comprises an AND circuit.

* * * * *